United States Patent [19]
Adey

[11] Patent Number: 4,966,096
[45] Date of Patent: Oct. 30, 1990

[54] WATER PURIFICATION SYSTEM AND APPARATUS

[75] Inventor: Walter H. Adey, Washington, D.C.

[73] Assignee: Ecological Systems Technology, L.P., Washington, D.C.

[21] Appl. No.: 228,114

[22] Filed: Aug. 4, 1988

[51] Int. Cl.⁵ .......................... A01K 63/04; C02F 3/08
[52] U.S. Cl. ........................................... 119/3; 119/5; 210/615
[58] Field of Search ............... 119/3, 5; 210/602, 615, 210/619

[56] References Cited

U.S. PATENT DOCUMENTS

| | | | |
|---|---|---|---|
| 2,867,945 | 1/1959 | Gotaas et al. | 47/1.4 |
| 3,025,831 | 3/1962 | Berardi | 119/2 |
| 3,155,609 | 11/1964 | Pampel . | |
| 3,198,171 | 8/1965 | Westphale | 119/1 |
| 3,232,271 | 2/1966 | Dosamantes De Jose et al. | 119/5 |
| 3,385,786 | 5/1968 | Klock | 47/1.4 |
| 3,387,587 | 6/1968 | Kelley et al. | 119/2 |
| 3,431,200 | 3/1969 | Davis et al. | 47/1.4 X |
| 3,462,360 | 8/1969 | McKinney | 47/1.4 X |
| 3,521,400 | 7/1970 | Ort | 47/1.4 |
| 3,557,753 | 1/1971 | Dantoni | 119/2 |
| 3,565,797 | 2/1971 | Gresham | 210/602 |
| 3,598,726 | 8/1971 | Welch | 47/1.4 |
| 3,661,262 | 5/1972 | Sanders | 210/169 |
| 3,760,767 | 9/1973 | Hickey | 119/3 |
| 3,763,824 | 10/1973 | Schoon | 119/4 |
| 3,839,198 | 10/1974 | Shelef | 47/1.4 X |
| 3,848,567 | 11/1974 | Garber, Jr. | 119/5 |
| 3,889,418 | 6/1975 | Porter et al. | 47/1.4 X |
| 3,929,101 | 12/1975 | Katz | 119/5 |
| 3,955,318 | 5/1976 | Hulls | 47/1.4 |
| 3,957,017 | 5/1976 | Carmignani et al. | 119/3 |
| 3,973,519 | 8/1976 | McCarty et al. | 119/3 |
| 4,005,546 | 2/1977 | Oswald | 47/1.4 |
| 4,076,619 | 2/1978 | Howery | 119/5 X |
| 4,213,421 | 7/1980 | Droese et al. | 119/3 |
| 4,267,038 | 5/1981 | Thompson | 210/602 |
| 4,324,200 | 4/1982 | Johnson | 119/2 |
| 4,333,263 | 6/1982 | Adey | 47/1.4 |

FOREIGN PATENT DOCUMENTS 624588 9/1978 U.S.S.R. .................................. 119/3

OTHER PUBLICATIONS

"The Coral Reef: Researching a Living System"; by the National Museum of Natural History, Smithsonian Institution.
"A Living Coral Reef Aquarium" by John Hackney, Sea Scope, Winter, 1985 pp. 3-4.
"And Live from the East Coast-a miniature Maine Ecosystem" BioScience, vol. 35, No. 10, Nov. 1985.
Adey, "The Microcosm: A New Tool for Reef research," Coral Reefs, 1983.

Primary Examiner—Robert P. Swiatek
Attorney, Agent, or Firm—Dickstein, Shapiro & Morin

[57] ABSTRACT

The present invention provides a water purification system that creates an integrated, small-scale marine or fresh water ecosystem that is particularly useful as a home, school, office, or laboratory aquarium. In operation, water from the aquarium tank is routed to an algal turf scrubber screen or equivalent algal-growing surface placed in a moveable, substantially flat, horizontally positioned, tray-shaped receptacle. An algal turf, comprising preferably a dense colony of microalgae, resides on the screen. As the receptacle fills with water, the center of gravity of the receptacle moves across the axis of the pivots upon which the receptacle is mounted. At this time, the substantially filled receptacle rotates on its pivots and the desired surge effect across the scrubber by the exiting water is achieved. The surge, light energy provided by lights above the receptacle, and algal photosynthesis promote metabolic cellular-ambient water exchange to remove carbon dioxide, dissolved nutrients and organic compounds, and other pollutants. Oxygen is also released into the water. The substantially emptied receptacle returns to its horizontal position and the purified and oxygenated water is then returned to the tank. In addition, other appropriate components of the ecosystems may be included, such as tide creators, high intensity, broad spectrum artificial lights over the tank, salinity controllers, pH controllers, sediment removers, temperature controllers, automatic feeders, timers and the like.

33 Claims, 3 Drawing Sheets

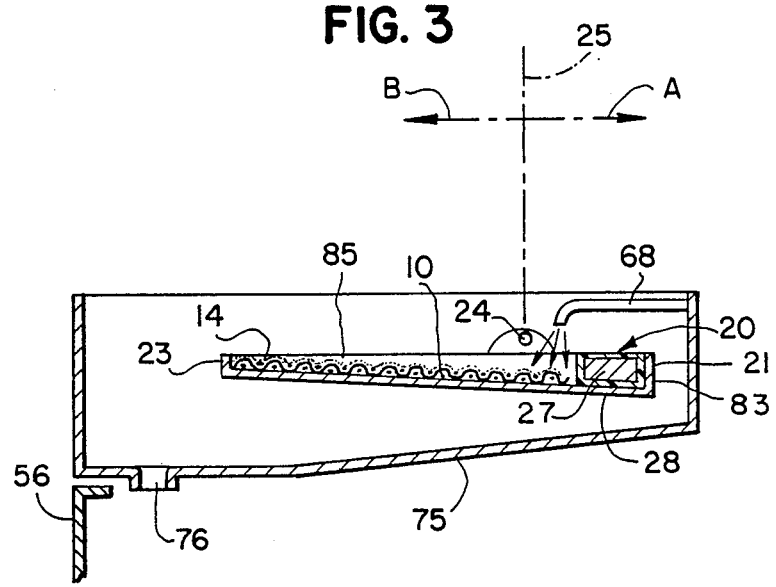
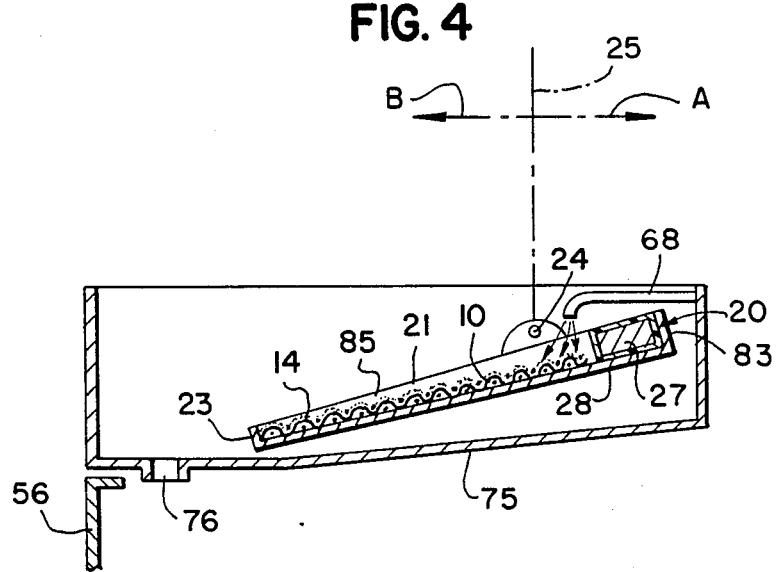

WATER PURIFICATION SYSTEM AND APPARATUS

BACKGROUND OF THE INVENTION

This invention relates generally to water quality control and purification systems and in particular to a water purification system and apparatus that creates an integrated, small-scale marine or aquatic ecosystem particularly useful as a home, school, office, or laboratory aquarium.

For centuries, man has attempted to re-create a small portion of the underwater environment, but this has proven to be an especially difficult task, particularly for a salt water environment. The difficulties of keeping marine life alive in captivity have been described as "witchcraft mixed with a little science."

Since fresh water organisms are more adapted to a changeable environment, generally past experience with fresh water culture has been more successful than with sea water, though not without considerable difficulties.

In the past, the problem has been said to be instability of water (particularly sea water) and its organic constituents, when confined in an aquarium or circulatory systems, and the characteristic inability of marine and to lesser extent aquatic organisms to adjust to changes in their environment. The necessary components of a proper environment were thought to include a chemically inert water system, a low ratio of animal life to volume of water, the control of bacteria, and the elimination of metabolic waste products.

In addition, since an aquarium contains a fixed volume of water, which is used repeatedly, its ecology is fragile and dependent upon many interrelated physical, chemical, and biological factors. These include the oxygen-carbon dioxide cycles, the nitrogen and phosphorus cycles, and the balance of particulate matter. With respect to the latter, soluble and insoluble organic and inorganic waste materials, which are excreted by aquatic specimens or which are formed by the natural decomposition by bacteria of plant and animal tissues, must be removed from the aquarium environment. This particulate matter, along with dissolved organic compounds, is converted by bacterial action to carbon dioxide and dissolved nutrients. The concentration of such metabolites in a fixed volume of water must be kept carefully balanced so that the system does not become overloaded, particularly by ammonia, carbon dioxide and nutrients, and at the same time depleted of oxygen.

In order to capture a complex aquatic environment in an aquarium, particularly a saltwater environment in a small home, school, office, or laboratory aquarium, it is necessary to simulate the natural environment. All of the physical and chemical components of the environment must be provided. Then the balance of plant and animal life and their proper relation to the volume of water must be adjusted. Previous attempts to do so on the scale of a home aquarium have not given sufficiently satisfactory results.

Traditional home aquaria have re-created only a limited part of the natural environment. Water quality is maintained by mechanical filters that remove sediment, by biological (bacteriological) filters that break down the first product of animal excretion, ammonia, and by systems for bubbling air through the water in order to add oxygen. Lighting is generally kept at a minimum in order to avoid algal blooms due to inherently high nutrient levels.

This traditional system has numerous inadequacies. Although biological filters remove particulate organic matter and ammonia, they can leave the system high in reactive nutrients. In addition, they consume oxygen and produce carbon dioxide. The latter compound has the undesirable effect of lowering the pH of the water, i.e., making the water more acidic. The filters used for organic sediment control can filter out plankton, whose presence is desirable in marine and aquatic ecosystems. Simple on/off lighting does not adequately simulate dawn and dusk, the time of greatest stress in the ecosystem. Finally, the low level of light does not add sufficient energy to support a complete and complex ecosystem. In sum, these systems are inherently unstable, and the organisms in them are prone to poor health and disease. Therefore, even the successful masters of the "witchcraft" of aquarium management have been limited to keeping only selected fish and a few invertebrates.

Several attempts have been made to improve upon conventional mechanical and bacterioloqical filtration of water by adding the filtration systems to the aquarium. See, for example, U.S. Pat. Nos. 3,929,101 to Katz, 3,848,567 to Garber, and 3,557,753 to Dantoni, which combine an algal filtration system with the standard bacteriological filter. Another approach has been to add biochemical filtration to the standard bacteriological filter in order to control pH. See U.S. Pat. No. 3,387,587 to Kelley. These approaches address one of the many components of an aquatic ecosystem, but they are a long way from duplicating such an ecosystem in a home aquarium.

A more system-oriented approach to water purification is disclosed in U.S. Pat. No. 3,155,609 to Pampel. This patent discloses a complex system of plumbing and chambers for directing water turbulence, calcium treatment, and a variety of limited band light treatments to purify eutrophic water from a biological source of pollution. The light treatments are regarded as having a variety of photochemical effects, and photosynthesis is used in one section of the system. Although the inventor asserted a microcosm-like control of a closed water system, there is no effort to use natural energy sources relative to real ecosystems. Also, there is no effort directed toward optimizing photosynthetic efficiency. Moreover, the purifying unit is separate from the biological unit being purified. Thus, the Pampel system is not an integrated system that could serve as a marine or aquatic ecosystem, particularly on a small scale.

Newer methods of water quality control utilize bacterial conversion of nitrogen to the gaseous form (denitrification). However, this is a process of low efficiency, and it does not handle phosphorus or lower carbon dioxide.

A major step forward in aquarium technology and aquatic-marine ecosystem simulation was made with the invention of the algal turf scrubber. The scrubber is described in U.S. Pat. No. 4,333,263 to Adey, which is incorporated herein by reference. This process provided the relatively high efficiency of photosynthesis for water purification in controllable form in the marine or aquatic environment. That algal turf scrubber utilizes dense mats of benthic microalgae which are subjected to light and water surge motion created by a wave generator to promote metabolic cellular-ambient water exchange as a means of removing carbon dioxide, dissolved nutrients and organic compounds, and a variety of pollutants from natural or waste water. The algal turf scrubber also injects oxygen into the aqueous environment. An important aspect of that invention is the use and optimization of wave surge motion to enhance the exchange of metabolites between the algal cells and the water media. By optimizing the surge motion and by continuously harvesting of the algae in a young, rapidly growing state, the photosynthetic efficiency of the algae is enhanced and optimized.

Such an algal turf scrubber has been used in a large, man-made marine ecosystem. See W.H. Adey, "The Microcosm: A New Tool For Research," in *Coral Reefs* (Springer-Verlag 1983), pgs. 193-201, which is incorporated herein by reference. It allowed the re-creation of a marine ecosystem on a large scale (1800 gallons) for the first time. No bacteriological filtration, chemical conditioning, or air bubbling was needed. The use of the algal turf scrubber also permitted the use of appropriately intense lighting, equivalent to sunlight, thereby providing sufficient naturally-derived energy for the maintenance of a complex ecosystem containing numerous and diverse living organisms.

However, until the present invention, it was not possible to operate such a complete ecosystem on a small scale, such as in a home, school, office, or laboratory aquarium involving approximately 40-150 gallons of water, because the necessary efficiency could not be achieved on such a small scale and in a fashion suitably compact for home or office use.

SUMMARY OF THE INVENTION

The present invention provides a closed, small-scale marine or fresh water ecosystem that is particularly useful as a home, school, office, or laboratory aquarium. In a preferred embodiment, it contains an aquarium tank, an improved algal turf scrubber, lighting systems for the scrubber and the aquarium tank, and a pumping system for bringing water from the tank to the scrubber. The improved algal turf scrubber combines the previously separated functions of water surge generation and algal turf scrubbing. The present invention provides, in a minimum acceptable space, the environmental factors required for aquatic and marine ecosystems, including filtration, nutrient, salinity and evaporation, pH, and temperature control, adequate light of appropriate spectrum and intensity, current and surge without killing desirable plankton, a tide-creating mechanism, and a feeding mechanism.

In operation, water from the aquarium tank is routed to an algal turf scrubber comprising a screen placed in a moveable, substantially flat, horizontally positioned, tray-shaped receptacle pivotally attached to a support structure. A colony of microalgae or smaller macroalgae resides on and is attached to the screen. Artificial lights are positioned above the screen. As the receptacle fills with water, the center of gravity of the receptacle moves across the axis of the pivots upon which the receptacle is mounted. At this time, the substantially filled receptacle rotates on its pivots and the desired water turbulence, in particular a surge effect, across the surface of the scrubber by the exiting water is achieved. The water is returned to the tank, and the substantially emptied receptacle returns by gravity to its horizontal position. The continual, periodic filling and dumping of the receptacle creates a periodic surge of water across the algae. The surge, artificial lights, and algae promote metabolic cellular-ambient water exchange for removing carbon dioxide, dissolved nutrients and organic compounds, and pollutants from the water in a highly efficient manner. Oxygen is also released into the water. The growing algal turf is periodically harvested before being overgrown by macroalgae.

The present invention also provides an apparatus and a method, particularly suited for efficient operation on a small scale, for removing a wide variety of organic and inorganic pollutants from water. Contaminated or polluted water is pumped from a storage facility to the improved algal turf scrubber previously described and then returned to the storage facility. After a sufficient number of cycles, the photosynthetic activity of the scrubber results in the conversion of all or substantially all of the dissolved nutrients and other pollutants to biomass. The purified water is then pumped to another storage facility.

Accordingly, it is an object of the present invention to provide a closed, small-scale marine or fresh water ecosystem that is particularly useful as a home aquarium.

Another object of the present invention is to provide an improved algal turf scrubber.

Another object is to provide a method for removing nutrients and waste from water and adding oxygen to the water.

Another object of the invention is to provide an apparatus for purifying water.

Other objects and advantages of the present invention will be readily apparent from the following description and the accompanying drawings. The drawings, which are incorporated in and constitute a part of this specification, illustrate the preferred embodiment of the invention.

BRIEF DESCRIPTION OF THE DRAWINGS

FIG. 3 is a view taken along section line III—III of FIG. 2 showing the moveable, substantially horizontal, tray-shaped receptacle for holding the microalgae.

FIG. 4 is a view like FIG. 3 showing the receptacle in its "tipped" position.

DESCRIPTION OF THE PREFERRED EMBODIMENT

Figure 1:
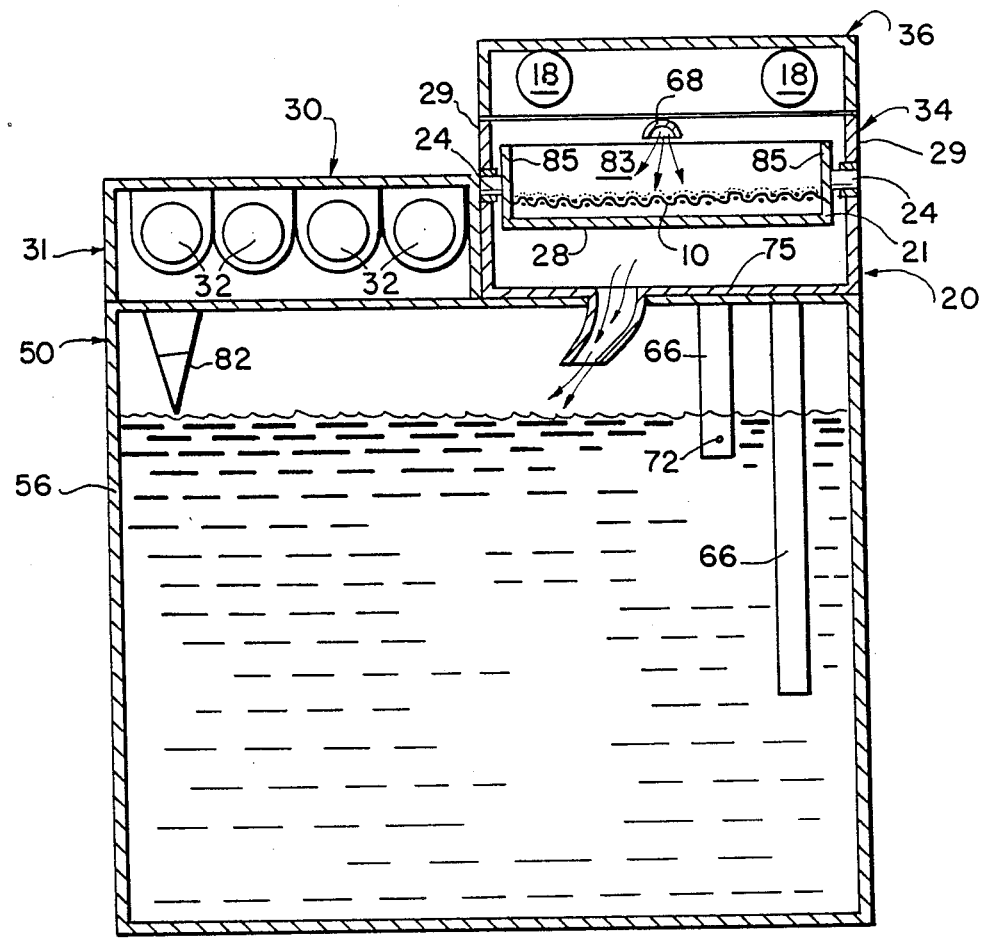
FIG. 1 is a partial cross sectional elevational view of the aquarium and algal turf scrubber according to the present invention.

Referring to FIG. 1, there is shown a cross sectional elevational drawing of an aquarium 50 according to the preferred embodiment of the present invention. The preferred embodiment employs a 120 gallon aquarium tank 56, but the system may be scaled up or down to accommodate different size tanks or other bodies of water to be cleaned, such as 70 gallon tanks and 40 gallon tanks.

The tank top unit, referred to generally by reference numeral 30, includes the tank lighting compartment referred to generally as reference numeral 31, the control unit referred to generally by reference numeral 34 and the cover to the control unit 34 referred to generally by reference numeral 36. Artificial tank lights 32 are housed within the compartment 31 and the artificial scrubber lights 18 are housed within the cover 36. The algal turf scrubber referred to generally as reference numeral 20 is housed within the control unit 34. A moveable, substantially horizontal, tray-shaped receptacle 21 pivots upon pivots 24, which are attached to and supported by the structure of side walls 29 of scrubber 20.

Water falling from the first conduit 68 falls unto the algal turf scrubber screen 10, which rests on or is attached to the upper surface of the bottom 28 of the receptacle 21. When the receptacle 21 pivots and water falls off the screen 10, as described more fully below and shown in FIGS. 3 and 4, the water falls unto the bottom inclined surface 75 of the scrubber 20 and is returned to the tank 56 through the second conduit 76, thereby creating a wave or surge in the tank 56.

Figure 2:
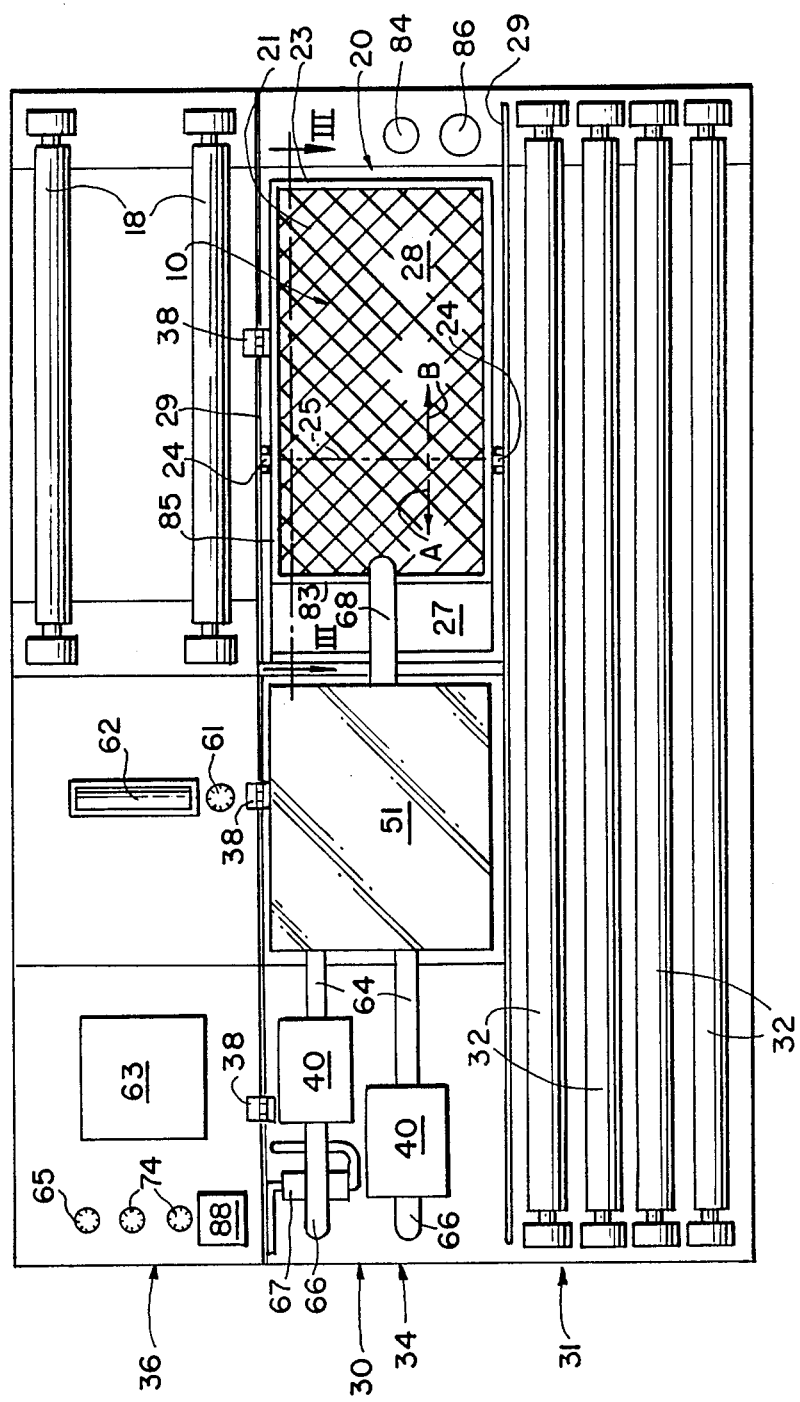
FIG. 2 is a plan view of the tank top unit of the aquarium of FIG. 1 with the cover opened.

Referring to FIG. 2, there is shown a plan view of the preferred embodiment of a tank top unit, generally designated by reference numeral 30, for creating a closed, small-scaled marine or fresh water ecosystem particularly useful as a home, school, office, or laboratory aquarium according to the present invention. The tank lighting compartment 31 of FIG. 2, roughly equaling the bottom third section, is the tank lighting section of the tank top unit. The middle section of the tank top unit 30, consisting of approximately the middle third as shown in FIG. 2, is the control unit generally designated by reference numeral 34. The control unit includes a pump means 40, a refugium 51, and the algal turf scrubber 20. Finally, the upper third portion of tank top unit 30 as shown in FIG. 2 is the cover of the control unit, generally designated by reference numeral 36. The cover 36 contains lights 18 for the scrubber, a quartz light 62 for the refugium 51, the timers 65 and 74, a level controller 63, and internal wiring 88. Timer 65 controls the scrubber lights 18, and timers 74 control the tank lights 32.

In the preferred embodiment, very high output fluorescent lights 32 are housed within tank lighting compartments 31. Timers 65 turn on and off lights 32 in a sequence such that the change from full dark to full brightness and vice-versa is gradual so as to simulate dawn and dusk respectively, these being the times of greatest stress in the ecosystem. The length of time the tank lights 32 are on will depend upon the actual ecosystem being simulated. With a coral reef system, for example, the lights will be on 12–14 hours. In the preferred embodiment, cooling holes on the upper surface of tank lighting compartment 31 are used to dissipate the heat from the lights 32, but other suitable methods of cooling, such as fans, may be used.

Water to be cleaned is taken from the aquarium tank 56 (FIG. 1) into the tank top unit 30 through the third conduits 66 by pump means 40 as shown in FIG. 2. Two third conduits 66 are used in the preferred embodiment. As shown in FIG. 1, one extends just below the surface of the water 58 in tank 56 and the other extends well below the surface of the water 58 of the tank 56. The suction from two separate points in the tank 56 minimizes the occurrence of any stagnant areas in the tank. A hole 72 disposed in one of the third conduits 66 just below surface 58 assures that, should water escape from the system through, for example, a leak that continued escape will not continue because, as the level 58 drops below hole 72 air will enter third conduit 66 rather than water and thus the leaking will stop. The pump 40 provides the suction needed to bring the water up from the aquarium tank 56. Pump 40 may be a lift, bellows, Archimedes screw, or any other suitable pump which will not destroy the plankton or other organisms in the water in large numbers. In the preferred embodiment, two pumps 40 are used in parallel, each connected to a separate third conduit 66 to assure back-up if one pump 40 fails.

The water exits the pumps 40 through the two fourth conduits 64, which force the water under pressure into the refugium 51. The refugium 51 acts as a safe haven from predation for the smaller organisms in the ecosystem such as insect larvae, smaller invertebrates, etc. The refugium 51 is sealed with a clear plastic cover on its upward surface to permit observation of the organisms within the refugium 51. The refugium 51 is sealed airtight so that the pressure from the pumps 40 is transmitted through fourth conduits 64 into the refugium 51 and ultimately forces water through first conduit 68, as described more fully below. The water then passes through the third conduit 68 by the pressure force of pumps 40 into the algal turf scrubber 20.

The refugium 51 may be removed to permit cleaning or observation away from the tank top unit 30. When the refugium 51 is removed, a "Y" shaped hose may be connected to fourth conduits 64 and first conduit 68 in order to maintain the flow of water. The refugium 51 need not be connected in series with the scrubber 20 as in the preferred embodiment and may constitute an entirely different system separate from the scrubber altogether.

As shown in FIG. 2, the algal turf scrubber screen 10 is positioned to cover substantially the entire bottom surface 28 of the moveable, tray-shaped receptacle 21. Receptacle 21, as shown in FIGS. 3 and 4, comprises a substantially flat rectangular shaped bottom 28 with a back wall 83 perpendicular to bottom 28 and substantially shorter than back wall 83 and two side walls 85 also perpendicular to bottom 28 and trapezoidally shaped. Thus, the water exiting from the first conduit 68 into the receptacle 21 flows over the algal turf scrubber screen 10. Screen 10 is suitably pitched with hole size and wire size dimensioned for growing microalgae, such as 0.5–5 mm mesh. The preferred embodiment uses a removable screen 10, but a suitably-grooved plastic surface, or other suitable algae-growing surfaces may also be used. Such surfaces include cotton gauze, spun glass, or similar materials.

In an alternative embodiment, the bottom surface 28 of the tray-shaped receptacle 21 may be used as the growing surface for the algae. In such cases, it is generally preferred that surface 28 be grooved or otherwise modified so that the microalgae may better attach to such surface.

An algal turf 14 resides on screen 10. As used herein, the term "algal turf" and its derivatives refers to a colony of attached microalgae and/or smaller macroalgae and/or spores of the microalgae or smaller macroalgae. The term "microalgae" refers to algae that are smaller than approximately 2 centimeters in height or length. Examples of such algae may be found in U.S. Pat. No. 4,333,263 to Adey, previously incorporated by reference. The term "smaller macroalgae" refers to algae that are smaller than approximately 20 centimeters in height or length. Examples of such algae include Gracilaria (a red algae), Enteromorpha (a green algae), and Dictyota (a brown algae). Benthic microalgae or a colony dominated by such algae are preferred. In certain ecosystems, however, a colony in which a significant percentage or even the majority of the algae are smaller macroalgae may be preferable. Generally, care must be taken to prevent the macroalgae from overgrowing the turf or the scrubbing efficiency of the system will decrease significantly.

In the beginning of the operation of the aquarium, it is generally more convenient to attach spores of the desired microalgae or smaller macroalgae to screen 10. Such spores, after being in contact with tank water and light, grow to provide the algal turf attached to the screen.

Also in operation, other types of small organisms, such as micrograzers, may be present on the screen or elsewhere in the tray-shaped receptacle 21. However, as long as the algae and preferably the microalgae continue to dominate the complex community, the scrubbing efficiency of the algae turf scrubber will be substantially maintained.

A portion of the microalgae on the screen 10 may be periodically removed by scraping the screen 10 to prevent the screen 10 from becoming overgrown with macroalgae. After scraping, some of the microalgae continues to reside on the screen 10 so as to start new growth of algae. Micrograzers, small organisms that consume the algae, are also removed by the scraping, thus assuring that the micrograzers do not come to dominate the algae system and thereby reduce efficiencies.

As the water fills up the receptacle 21, it falls onto the screen 10 which is attached to or otherwise positioned on the upper side of surface 28 of the receptacle 21. The screen 10 may be positioned above the upper side of surface 28 of the receptacle 21 or upon any other suitable surface to promote metabolic cellular-ambient water exchange for purification of the water as described more fully below.

As shown in FIG. 2, receptacle 21 is mounted to walls 29 on pivots 24. The axis 25 of pivots 24 is designated by reference numeral 25 in FIGS. 2, 3 and 4. Receptacle 21 is shaped such that, when emptied of water, the center of gravity of receptacle 21 is positioned on the side of axis 25, designated as side A in FIGS. 2, 3 and 4. In the preferred embodiment, a lead counter weight 27 is positioned on the side A of receptacle 21. Weight 27 is completely encased in plastic to avoid contamination to the system. As the receptacle 21 fills with water, the center of gravity of the receptacle 21 shifts from side A of the axis 25 to side B of the axis 25. A low friction and corrosion-free material such as teflon or the like, is used for the pivots 24.

FIG. 3 shows the receptacle 21 in its filling position. Because the receptacle 21 is not substantially full of water in FIG. 3, the center of gravity resides on the A side of axis 25 and the receptacle 21 is not pivoted with respect to pivots 24.

FIG. 4 shows the receptacle 21 in its draining position. The center of gravity has moved from the A side of axis 25 to the B side of axis 25 and, accordingly, the 21 is pivoted with respect to pivots 24. Water flows downward off the algal turf scrubber screen 10 and algal turf 14 and over the lip 23 of the receptacle 21. The water is caught by the bottom surface 75 of the scrubber 20 and exits through the second conduit 76 back to the tank 56. Water exiting through the second conduit 76 falls onto the upper surface 58 of the water in tank 56. The periodic falling of water into the tank 56 causes a surge in tank 56, which simulates waves and surges such as those present in lakes and oceans. Such action helps distribute the scrubbed (cleaned and oxygenated) water in tank 56. Second conduit 76 may be shaped, for example, concaved, to target a surge of scrubbed water back into a particular area of the tank 56, if desired for practical or aesthetic reasons. For example, second conduit 76 may be a nozzle or spout pointed at the forereef of a reef, or if no surge is desired, second conduit 76 may be formed as a long slot thereby reducing the surge effect of the scrubbed water entering the tank 56.

In FIG. 2, the cover 36 of the control unit 34 is shown as opened upon its hinges 38. Artificial lights 18 are positioned above the scrubber 20. The artificial lights 18 provide light of sufficiently wide spectrum and intensity so as to match substantially the sunlight in the particular natural ecosystem sought to be created in the small-scale aquarium. Such ecosystems include a coral reef, a marine estuary, a tropical rain forest river, and a fresh water lake. The lights should deliver substantially all of the wave lengths of natural light at an output of about 50% to 110% of natural light. Very high output fluorescent lights are preferred, although in some case metal halide lamps may be used. Such lamps are chosen in order to provide light energy in the range of approximately 300 uE/m$^2$/sec to 1200 uE/m$^2$/sec to simulate the solar energy available in the wild environment. In the preferred embodiment, photosynthetic efficiencies of 2% to 6% may be achieved. (As used herein, the term "photosynthetic efficiency" and derivatives thereof is intended to refer to the conversion of light energy as measured in microeinsteins to algal biomass, the energy of the biomass being measured by means known in the art by placing the algae produced by the operation of the scrubber into a calorimeter, burning the algae to convert it to heat, and measuring the heat. The artificial lights 18 are preferably operated at night; i.e., primarily when the tank lights are off. Twelve to fourteen hours are generally preferred, with the time being determined and adjusted by the amount of algae being produced and the demands on the ecosystem. In the preferred embodiment, cooling holes on the upper surface of cover 36 are used to disipate the heat from the lights 18, but other suitable means of cooling, such as fans, may be used.

Also shown in FIG. 2, quartz or halide lamp 62 may be positioned on the cover 36 so as to reside above the refugium 51 when the cover 36 is closed. The lamp 62 provides necessary lighting to the organisms in the refugium 51 and is controlled by timer 61.

Thus, in the operation of the preferred embodiment, the water from the tank 56 is brought by lift pumps 40 to the algal turf scrubber 20 where it is subjected to an algal turf 14 which resides on the screen 10, light from the artificial lights 18, and the periodic surge motion caused by the tipping and recovery of the receptacle 21. This promotes metabolic cellular-ambient water exchange for removing carbon dioxide, dissolved nutrients and organic compounds, and a variety of pollutants from the water. The algae on screen 10 also release oxygen into the water. The conduits 68, 76, 66, and 64, the pumps 40, refugium 51, scrubber 20, and receptacle 21 are designed and dimensioned such that the volume of flow and the period of the tipping is sufficient to provide adequate purification of the water. For example, the system may be designed and dimensioned to tip the receptacle 21 every five to thirty seconds. Preferably, the receptable 21 is tipped every 5 to 15 seconds and most preferably approximately every 10 seconds. In the preferred embodiment, pumps 40 pump about 5 gallons per minute, and the screen 10 is 10"×36".

In an alternative embodiment having a 70 gallon tank pumps 40 pump about 3 gallons per minute, the screen 10 is 6"×18" and the period of tipping is about 5 to 15 seconds.

In another alternative embodiment involving a 40 gallon tank, pumps 40 pump about 2 to 3 gallons per minute, the screen 10 is 6"×12" and the period of tipping is 5 to 15 seconds.

Because salinity increases as the volume of water decreases from evaporation, by maintaining a constant volume of water in the tank 56, the preferred embodiment maintains constant salinity in the water. A water level sensor 82 (FIG. 1), which in the preferred embodiment is an infra-red water level sensing device, monitors water level 58. If level 58 falls too low, sensor 82 triggers water top off pump 67 (FIG. 2). The pump 67 draws fresh water from a reservoir.

Where a more acidic environment is required or desired, as in an ecosystem simulating a tropical rain forest river, means for controlling the pH are combined with the salinity control means as follows. Pump 67 draws liquid from two separate reservoirs, one of which contains fresh water, the other of which contains an acid solution. The acid solution contains a 15:1 molar ratio of nitrogen in nitric acid to phosphorus in phosphoric acid. Pump 67 draws from each reservoir at a predetermined ratio so as to maintain the desired pH in the water of tank 56 as well as the desired salinity. A single pump, such as a Master-flex pump, connected by a tube to tank 56 and drawing from both reservoirs through two tubes is used. Because the microalgae use nitrogen and phosphorus at a ratio of 15 to 1 as food, the nitrates and phosphates are converted into biomass, removing them from the ecosystem. Thus, acidity is maintained by natural means without the addition of special chemicals that are left in the water or that must be removed by special means.

Additionally, as also shown in FIG. 2, features well known in the art may be supplied. These include a tide creator, temperature controllers 84, automatic feeders 86, and ballasts for the lights.

Preferably, plastic materials are used for construction to the greatest extent possible to avoid corrosion and contamination of the water by metals.

In an alternative embodiment, the claimed invention provides a method and apparatus for purifying or treating in an efficient manner. It can be used in the treatment of sewage or other forms of water pollution or in the cleaning or purification of well water, tap water, or water in swimming pools. Such apparatus comprises an appropriate support structure, the improved algal turf scrubber of the present invention, the appropriate artificial lights for the scrubber, and pumps and pipes to bring contaminated water to the scrubber receptacle. In operation, the waste water is pumped from a storage tank to the tray-shaped receptacle which, when substantially filled, tips, spilling the water and creating the surge motion that promotes metabolite cellular-ambient water exchange. The water is recycled a sufficient number of times until the desired level of purification is reached. Once a desired level of purification is achieved, the water is released from the storage tank and a new batch of contaminated water is pumped into it so that the process may start again.

The above description and drawings are only illustrative of a preferred embodiment which achieves the objects, features, and advantages of the present invention, and it is not intended that the present invention be limited thereto. Any modifications of the present invention which comes within the spirit and scope of the following claims is considered part of the present invention.

I claim:

1. An algal turf scrubber comprising:
    a moveable, substantially flat surface for growing an algal turf when said surface is in contact with water;
    an algal turf attached to said surface; and
    moving means for moving said surface to create an oscillatory surge of water across said algal turf when it is in contact with water.

2. The algal turf scrubber of claim 1 further comprising a support structure to which said surface is attached.

3. The algal turf scrubber of claim 2 further comprising artificial light means attached to said support structure and positioned to illuminate said algal turf.

4. An algal turf scrubber comprising:
    a support structure;
    a moveable, substantially flat surface for growing an attached algal turf when said surface is in contact with water, wherein said surface is substantially horizontal and pivotally attached to said support structure to pivot about an axis in the same plane as said movable surface; and
    an algal turf attached to the upper side of said movable surface.

5. The algal turf scrubber of claim 4 wherein surface is a tray-shaped receptacle.

6. The algal turf scrubber of claim 5 wherein the center of gravity of said receptacle shifts from one side of said axis to the other side when a sufficient amount of water is placed in said receptacle, causing said receptacle to rotate partially about said axis and to dump said water and wherein said center of gravity shifts back across said axis after said water is dumped, returning said receptacle to a substantially horizontal position.

7. The algal turf scrubber of claim 6 further comprising means for introducing water into said receptacle.

8. The algal turf scrubber of claim 7 further comprising artificial light means positioned above said receptacle.

9. The algal turf scrubber of claim 8 further comprising a screen positioned upon the upper surface of the bottom of said receptacle, wherein said algal turf is attached to said screen.

10. A method of removing nutrients and waste from water and adding oxygen to water comprising the steps of:
    providing a growing surface for an algal turf wherein said surface is in contact with said water and said algal turf is attached to the upper side of said surface;
    subjecting said surface to light to grow said algal turf on said surface;
    creating an oscillatory water surge motion across said algal turf by moving said surface in a periodic motion; and
    periodically removing a portion of said algal turf prior to said turf being overgrown by macroalgae.

11. The method of claim 10 wherein said periodic motion of said surface comprises the partial rotation of said surface about an axis through the plane of said surface.

12. A method of removing nutrients and waste from water and adding oxygen to water comprising the steps of:
    providing a tray-shaped receptacle for growing an attached algal turf when said algal turf is in contact with water, wherein said receptacle is pivotally attached to a support structure to pivot about an axis in the same plane as said receptacle, said receptacle being substantially horizontal and in contact with said water and wherein said algal turf is attached to the upper surface of said receptacle;

subjecting said receptacle to light to grow said algal turf on said surface;

creating a water surge motion across said algal turf by periodically filling said receptacle with said water and dumping said water from said receptacle by partially rotating said receptacle around said axis and returning said receptacle to its substantially horizontal position; and periodically removing a portion of said algal turf growing on said surface prior to said turf being overgrown by microalgae.

13. The method of claim 12 wherein the center of gravity of said receptacle first shifts from one side of said axis to the other side when a sufficient amount of water is placed in said receptacle, causing said receptacle to rotate partially about said axis and to dump siad water, and said center of gravity then returns to its original position, causing said receptacle to resume a substantially horizontal position.

14. An apparatus for purifying water comprising:
a support structure;
a moveable, substantially flat surface for growing an algal turf when said surface is in contact with water, said surface being attached to said support structure.
an algal turf attached to said surface:
moving means for moving said surface to create an oscillatory surge of water across said surface when said surface is in contact with said water, said means attached to said surface and said support structure; and
artificial light means attached to said support structure and positioned to illuminate said algal turf.

15. The apparatus of claim 14 further comprising pump means for delivering said water to said surface.

16. An apparatus for purifying water comprising:
a support structure;
a substantially flat, horizontally-positioned, tray-shaped receptacle, said receptacle pivotally attached to said support structure to pivot about an axis in the same plane as said receptacle;
an algal turf attached to said receptacle; receptacle;
pump means for delivering said water to said receptacle; and
artificial light means attached to said support structure and positioned to illuminate said algal turf.

17. An aquarium comprising:
a tank for containing water and aquatic specimens;
a substantially flat, horizontally positioned tray-shaped receptacle, said receptacle pivotally attached to a support structure to pivot about an axis in the same plane as said
an algal turf attached to the upper surface of said receptacle;
artificial light means positioned to illuminate said algal turf; and
pump means for moving water from said tank to the upper surface of said receptacle.

18. The aquarium of claim 17 wherein the center of gravity of said receptacle shifts from one side of said axis to the other side when a sufficient amount of water is placed in said receptacle, causing said receptacle to rotate partially about said axis to dump said water, and wherein said center of gravity returns to its original position after said water is dumped, causing said receptacle to return to a substantially horizontal position.

19. The aquarium of claim 18 wherein said pump means creates a periodic water surge motion across the upper surface of said receptacle by filling said receptacle with water from said tank, causing said receptacle to periodically dump said water and return to said substantially horizontal position.

20. The aquarium of claim 19 wherein the dumping motion of said receptacle returns said water to said tank.

21. The aquarium of claim 19 wherein the period of said surge ranges from approximately 5 to 15 seconds.

22. The aquarium of claim 21, wherein the period of said surge is approximately 10 seconds.

23. The aquarium of claim 17 wherein said artificial light means delivers to the surface of said receptacle substantially all of the wavelengths of natural light at an output of about 50% to 110% of natural light.

24. The aquarium of claim 17 wherein said artificial light means delivers approximately 300 to 1200 microeinsteins per $m^2$ per sec.

25. The aquarium of claim 17 wherein said pump means is a lift pump.

26. The aquarium of claim 17 further comprising one or more elements selected from the group consisting of a refugium, artificial light means positioned over said tank, means for removing sediment, means for controlling the salinity of the water, means for controlling the pH of the water, means for controlling water temperature, means for creating a tide in said tank, means for creating a current in said tank, and means for introducing food for said aquatic specimens into said tank.

27. The aquarium of claim 17 further comprising artificial light means positioned above said tank, wherein said artificial light means simulates the transition in intensity of light from dawn to dusk and vice-versa.

28. The aquarium of claim 27 wherein said light means comprises a set of lights and a timer that turns the set of lights on or off, one at a time, in a predetermined sequence.

29. The aquarium of claim 17 further comprising pH control means.

30. The aquarium of claim 29 wherein said pH control means comprises pump means in fluid connection with said tank, a water reservoir, and an acid reservoir, wherein said pump means pumps said water and said acid from said reservoirs at a predetermined ratio to said tank to achieve the desired pH in said water in said tank.

31. The aquarium of claim 30 wherein said acid reservoir comprises an approximately 15 to 1 molar ratio of nitrogen in nitric acid to phosphorus in phosphoric acid.

32. An aquarium comprising:
a tank for containing water and aquatic specimens;
an algal turf scrubber including: a moveable, substantially flat surface for growing an algal turf when said surface is in contact with water; an algal turf attached to said surface; and moving means for moving said surface to create an oscillatory surge of water across said algal turf when it is in contact with water;
a support structure to which said surface is attached; and
artificial light means attached to said support structure and positioned to illuminate said algal turf.

33. An aquarium comprising:

a tank for containing water and aquatic specimens;

an algal turf scrubber including:

a support structure; a moveable, substantially flat surface for growing an attached algal turf when said surface is in contact with water, wherein said surface is substantially horizontal and pivotally attached to said support structure to pivot about an axis in the same plane as said movable surface; and an algal turf attached to the upper side of said movable surface;

artificial light means positioned to illuminate said growing surface; and pump means for moving part of said water from said tank to the growing surface of said algal turf scrubber.

* * * * *